United States Patent [19]

MacPherson

[11] Patent Number: 5,297,450
[45] Date of Patent: Mar. 29, 1994

[54] POSITIVE VARIABLE DRIVE TRANSMSISSION

[76] Inventor: Roger MacPherson, 185 Pleasant Way, Penfield, N.Y. 14526

[21] Appl. No.: 777,370

[22] Filed: Nov. 21, 1991

Related U.S. Application Data

[63] Continuation-in-part of Ser. No. 357,407, May 26, 1989, Pat. No. 4,958,533.

[51] Int. Cl.$^5$ .................................. F16H 3/08
[52] U.S. Cl. .................................. 74/333; 192/44; 192/8 R
[58] Field of Search ................ 74/333, 336 R; 192/3.23, 8 R, 44

[56] References Cited

U.S. PATENT DOCUMENTS

| | | | |
|---|---|---|---|
| 3,326,339 | 6/1967 | Suri | 192/3.23 |
| 3,507,371 | 4/1970 | Richard et al. | 192/3.23 |
| 4,437,550 | 3/1984 | Nozawa | 192/3.23 X |
| 4,958,533 | 9/1990 | MacPherson | 74/333 |
| 5,145,042 | 9/1992 | MacPherson . | |

Primary Examiner—Leslie A. Braun
Assistant Examiner—Khoi Ta
Attorney, Agent, or Firm—Eugene Stephens & Associates

[57] ABSTRACT

A variable speed transmission includes parallel driver and driven shafts (54, 56) which mount respective series of intermeshing gears (60–65, 70–75) of progressively increasing gear ratio for selectively transmitting power from one shaft to the other. A series of two-way roller clutches are interposed between the driven shaft (56) and respective gear members (70–75) of the series of driven gears. The roller clutches are engageable for rotatively coupling the driven gears (70–75) to the driven shaft (56) and are disengageable for permitting relative rotation between the driven gears and the driven shaft. Each of the roller clutches includes a cam disk (10) having a plurality of recesses (20) formed in its peripheral surface and a roller retainer (12) circumferentially supporting a plurality of rollers (32) within respective recesses (20) in the cam disk. A hydraulically controlled actuator is operatively connected to each of the retainers (12) for indexing the roller retainers (12) together with the plurality of rollers (32) between respective limit positions within the recesses. The actuating means includes an annular plate (22, 24) rotatively coupled to the roller retainer and angularly spaced vanes (44) in communication with a pair of fluid supply ducts (92, 94 and 96, 98) of a stationary hydraulic housing (80–85). One of the supply ducts (92, 94) provides for indexing the roller retainer (12) to one of the limit positions, and the other of the supply ducts (96, 98) provides for indexing the roller retainer (12) to the other limit position.

7 Claims, 5 Drawing Sheets

POSITIVE VARIABLE DRIVE TRANSMSISSION

This is a continuation of international application no. PCT/US90/02962, filed 25 May 1990, designating the United States for treatment as a continuation-in-part of U.S. application Ser. No. 357,407, filed 26 May 1989, now U.S. Pat. No. 4,958,533.

TECHNICAL FIELD

My invention relates to transmissions and, in particular, to automotive transmissions of the type which include a series of intermeshing gear pairs of differing gear ratios that are selectively engaged by overrunning clutches.

DESCRIPTION OF RELATED ART

Most automotive transmissions are one of two types, namely, standard shift transmissions or automatic transmissions. Both types provide for interconnecting a vehicle's engine with a drive train to the vehicle's wheels with different gear ratios. Standard shift transmissions are shifted between the different gear ratios by declutching the drive train, shifting a gear or coupling axially between gear pairs of different gear ratios, and reengaging the clutch. Automatic transmissions provide torque converters or other types of fluid couplings connecting various elements of planetary gear systems for shifting between different effective ratios of the planetary systems without disengaging a clutch. Also, the standard shift transmissions are manually controlled, whereas the automatic transmission are shifted automatically based on speed and torque levels being transmitted through the transmission.

Another less common type of transmission combines elements of both standard shift and automatic transmissions. Shifting between gear pairs of different gear ratios is accomplished without declutching the drive line, but the shifting is also done without using any planetary gears or fluid couplings. A pair of parallel driver and driven shafts is used to mount gear pairs of progressively varying ratio. Although all of the gear pairs are maintained in constant mesh, one gear member of each pair is connected to its associated shaft by an overrunning clutch. The clutches may be engaged in response to one direction of relative rotation between the respective gear members and their associated shaft and disengaged in response to the opposite direction of the same relative rotation. Control arms are also used to selectively deactivate the overrunning clutches so that the clutches cannot be engaged in response to either direction of relative rotation.

Three conditions must be fulfilled to engage any one of the overrunning clutches. First, the respective control arms must be moved to a position which does not deactivate the overrunning clutches; second, the clutches must be indexed to positions at which they may be engaged; and third, relative rotation between the respective gear members and associated shaft must be in a particular direction.

For example, the transmission may be maintained in the so-called "neutral" position by moving the control arms to positions which deactivate all of the overrunning clutches. The so-called "first gear" position is achieved by moving one of the control arms to a position which enables the overrunning clutch associated with a gear member of the highest gear ratio pair to be activated. The overrunning clutch is subsequently indexed to the position at which it is engaged by relative rotation in a direction which transmits drive power from a vehicle's engine to its wheels. "Second" and higher gear positions are achieved in a similar manner by moving the control arms of the lower gear ratios into positions which enable their associated clutches to be subsequently engaged.

However, when the transmission is positioned in second gear or higher, it is not necessary to move the respective control arms of the first or lower gears to a deactivated state. Relative rotation between the gear members and associated shaft of the higher gear ratios (e.g., first gear) is in a direction opposite to the relative rotation of the engaged lower gear ratio (e.g., second gear), and the opposite relative rotation of the higher gear ratios automatically disengages their overrunning clutches. Once disengaged, the respective gear members of the higher gear ratios freewheel on their associated shaft.

SU, A, 1237824 (Kononchenko et al.) discloses an automotive transmission of the just above-described type including a driver and a driven shaft mounting a series of gear pairs of differing gears ratios. One member of each gear pair is rotatively coupled to the driver shaft, and the other member of each pair is operatively connected to the driven shaft by an overrunning clutch. The gear pairs vary in gear ratio from one end of the shafts to the other. For example, the gear members mounted on the driver shaft progressively increase in pitch diameter from one end of the shaft to the other, and the mating gear members on the driven shaft correspondingly decrease in pitch diameter in the same direction along the driven shaft.

The respective overrunning clutches include three main parts, namely, a cam disk rotatively connected to the output shaft, a bearing retainer supporting a series of ball bearings, and a bearing race formed in a bore of a gear member mounted about the driven shaft. Springs are provided in the bearing retainer to urge the ball bearings along respective ramp surfaces of the cam disk into contact with the bearing race. The ramp surfaces of the cam disk are oriented with respect to the springs so that the bearings become wedged between the cam disk and bearing race in response to one direction of relative rotation between the gear member and cam disk, but the bearings are rolled out of wedging engagement by the opposite direction of the relative rotation.

Control arms are used to move the respective ball bearings against their spring bias into positions which selectively deactivate the clutches. However, the control arms can also be moved to different positions which do not oppose the spring bias of one or more of the clutches. Gear pairs joining the driver and driven shafts may be selectively engaged at the different positions of the control arm in response to a direction of relative rotation required for accelerating a vehicle under engine power. However, no provision is made for engaging the clutches in the opposite direction of relative rotation required for decelerating the vehicle by engine resistance. Also, once engaged in high gear (i.e., the lowest gear ratio), it is not possible to disengage the lowest gear ratio until the transmission of torque through its associated clutch is significantly reduced.

Another known transmission of the same general type is disclosed in U.S. Pat. No. 4,817,451 (Weismann). The Weismann reference uses two-way roller clutches in place of the one-way ball bearing clutches of Kononchenko, but includes control arms that are also movable to positions for deactivating selected roller clutches. However, instead of using springs to urge the rollers into a position of possible engagement, a small amount of friction is provided between a roller retainer and an inner race of a gear member so that the rollers are moved to one of two positions of possible engagement by relative rotation of the gear member.

Once again, movement of the control arms has only the indirect effect of permitting engagement of the roller clutches. The roller clutches rely on friction to actually move the roller retainer into one of two possible positions of engagement. The shifting mechanism may be subject to wear which can affect the reliability of the transmission or which can produce further delays in the response time of the transmission to requirements for a gear shift.

SUMMARY OF THE INVENTION

My invention improves transmissions using overrunning clutches to selectively engage gear pairs of different ratios by providing an externally controlled actuator that indexes the overrunning clutches between two limit positions. Neither of the limit positions deactivates the overrunning clutches. One of the limit positions enables engagement of the overrunning clutches in response to one direction of relative rotation between gear members and their mounting shaft, and the other limit position enables engagement of the overrunning clutch in response to the opposite direction of relative rotation.

Accordingly, the overrunning clutches of my transmission are maintained in one or the other limit positions at which the clutches are engageable by an appropriate direction of relative rotation between the respective gear members and their mounting shaft. One of the directions of relative rotation corresponds to the delivery of forward drive power to a vehicle's wheels, and the other direction corresponds to the delivery of reverse drive power to the wheels. However, the direction of reverse drive power is also the same direction of relative rotation required to use the engine to brake the forward momentum of the vehicle, and the direction of forward drive power is the same as the direction using the engine to brake the reverse momentum of the vehicle.

At each limit position, the overrunning clutches are also disengageable by the opposite direction of relative rotation which engages them. Thus, instead of using an actuator to deactivate the overrunning clutches in both directions of relative rotation, my invention provides for selectively engaging the overrunning clutches by indexing the clutches to one or the other limit positions at which the respective clutches are either engaged or disengaged depending upon the direction of relative rotation between the respective gear members and their mounting shaft.

Preferably, each of the overrunning clutches is defined as a two-way roller clutch including a cam disk having a plurality of recesses formed in its peripheral surface and a roller retainer circumferentially supporting a plurality of rollers within respective recesses in the cam disk. A bearing race formed in the hub of a respective gear member surrounds the cam disk and roller retainer. The cam disk is rotatively connected to a driven shaft, and the rollers are wedged between the cam disk and bearing race to rotatively connect the respective gear member to the driven shaft.

The two limit positions of each roller clutch are defined in part by opposing ramp surfaces at opposite ends of the respective recesses in the cam disk. The roller retainer, together with the plurality of rollers, is indexable relative to the cam disk between the limit positions at which the rollers are urged into contact with one or the other ramp surfaces and the bearing race. However, the rollers are supported within the roller retainer between a pair of springs which permit some relative movement of the rollers with respect to the retainer. The relative movement of the rollers is used to compensate for any manufacturing variations in the rollers, retainer, or cam disk which would prevent all of the rollers of a retainer from becoming wedged between the cam disk and bearing race. However, the same relative movement of the rollers also enables the rollers to roll out of wedging engagement in response to an opposite direction of relative rotation between the cam disk and respective gear member.

Preferably, hydraulically operated actuators are used to index the roller retainers of each roller clutch between the two limit positions. Each of the hydraulically operated actuators includes a stationary control housing having a pair of fluid supply ducts. Angularly spaced vanes are formed in the periphery of an annular plate that is connected to one end of the roller retainers. The vanes are positioned in communication with the fluid supply ducts so that fluid discharged from the supply ducts strikes the vaned annular plates tangentially and causes the roller retainer to rotate with respect to the cam disk. Separate ducts are provided for rotating the roller retainers in opposite directions, thereby indexing the roller retainers between the two limit positions. The vanes may also be inclined with respect to radial lines of the annular plates to facilitate additional rotation of the plates in the same direction that the cam disks are ordinarily rotated within the transmission.

An onboard computer or other appropriate means may be used to control the actuators of each roller clutch for successively engaging the roller clutches at one or the other limit positions. During periods of vehicle acceleration under drive power, gear pairs of progressively lower gear ratio are engaged for shifting the transmission from low to high gear. In so doing, the actuators progressively index the respective roller clutches of each succeeding lower gear ratio pair to the same limit position at which drive power is conveyed to the drive wheels. However, only the gear pair of the lowest gear ratio (e.g., high gear) remains engaged at any one time, because the direction of relative rotation between the respective gear members and cam disks of the higher gear ratios (e.g., low gear) is reversed.

In that regard, it is especially important to maintain the higher gear ratios at the same limit position at which they were previously engaged. If any one of the higher gear ratio pairs were to be indexed to the opposite limit position at the same time a lower gear ratio is also engaged for delivering drive power, driver and driven shafts of the transmission would be connected by two different gear ratio pairs which would result in a torque windup between the shafts that could break apart the transmission.

Accordingly, my invention provides for interlocking the roller retainers of adjacent roller clutches to limit relative movement between them. Although all of the roller retainers may be indexed between the two limit positions, the roller retainers of the higher gear ratios are captured in the same limit position at which a lower gear ratio is engaged for delivering engine power to the wheels. The annular plates of adjacent roller clutches may be interlocked by respective pins and slots formed in their opposing surfaces. The slots are dimensioned so that each roller clutch is indexable between two limit positions at one limit position of an adjacent roller clutch, but the same clutch is not indexable from one index position to another at the other limit position of the adjacent roller clutch. For example, the roller clutches associated with the lower gear ratios may be used to hold the roller clutches of the higher gear ratios in place at the same limit position. However, roller clutches of any gear ratio lower than the engaged gear ratio may be indexed in succession to positions of engagement.

A computer controlled disk brake may be connected to the driver shaft of my transmission to permit disengagement of any one of the roller clutches otherwise locked in engagement by the transmission of torque. The disk brake momentarily relieves the torque being transmitted through the roller clutch so that the roller clutch may be indexed to an opposite limit position at which it is disengaged. This feature permits my transmission to be "down shifted" to a higher gear ratio without significantly interrupting the transmission of power through my transmission.

DRAWINGS

DETAILED DESCRIPTION

Figure 1:
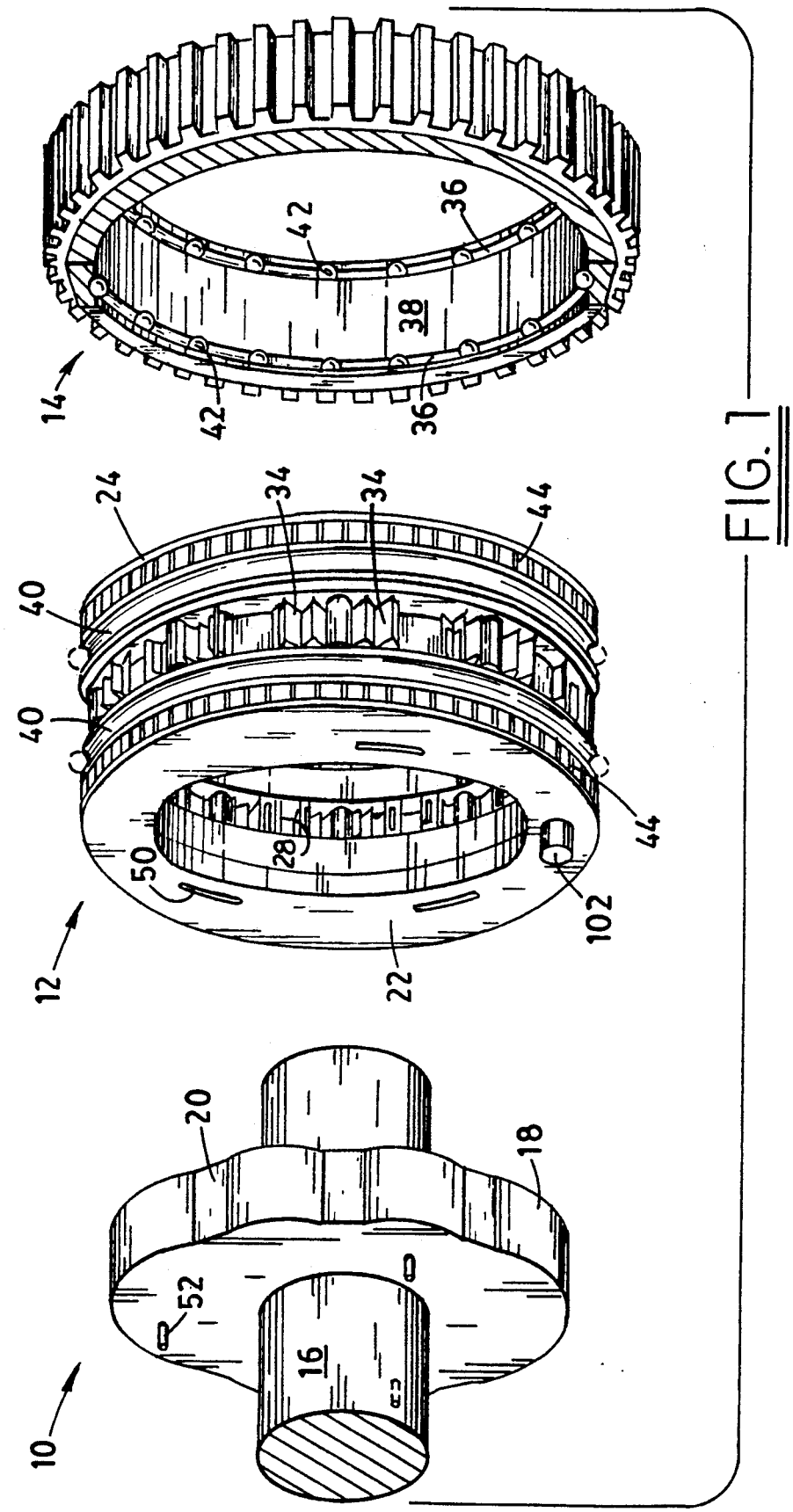
FIG. 1 is an exploded perspective view of the principal parts of an improved two-way roller clutch according to my invention.

A two-way roller clutch, the type which is particularly suitable for use with my invention, is illustrated by FIGS. 1-4. The roller clutch includes three main parts, namely, a camming member in the form of cam disk 10, a roller retainer 12, and a ring gear 14. The cam disk 10 is connected for rotation with shaft 16 and has formed in its peripheral surface a plurality of equally spaced cam lobes 18 that are separated by similarly spaced recesses 20.

Cam disk 10 is disposed within roller retainer 12 between a pair of annular plates 22 and 24 that are spaced apart by arcuate web sections 26. Bearing surfaces 28 of the web sections provide for rotatively mounting the roller retainer on lobes 18 of the cam disk. Web sections 26 are spaced similar to the lobes 18 of cam disk 10, and the spacing provides clearance openings for mounting rollers 32 between the adjacent web sections. A pair of compression springs 34 resiliently support each roller 32 between web sections 26 and permit the rollers 32 to move a limited amount in either circumferential direction against one or the other springs. However, the rollers are held axially in place by the annular plates 22 and 24.

Ring gear 14 has formed within its hub surface a plurality of bearing races. A pair of bearing races 36 is formed on either side of bearing race 38 within the gear hub and cooperates with another pair of bearing races 40 formed on peripheral surfaces of the respective annular plates 22 and 24 for rotatively mounting ring gear 14 on bearings 42. The bearings 42 and bearing races 36 and 40, together with bearing surfaces 28 and lobes 18, rotatively mount ring gear 14 on shaft 16. The other bearing race 38 encloses rollers 32 carried by retainer 12.

Figure 2:
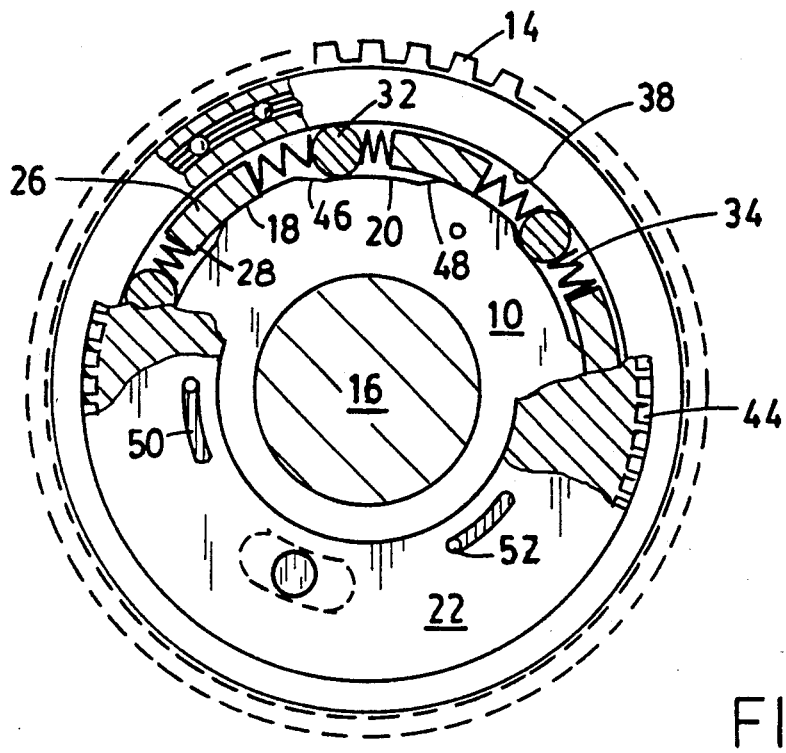
FIG. 2 is an end view of the parts shown in FIG. 1 as they appear when assembled, but with portions broken away and shown in section, and with the rollers shown in one of their two limit positions.
Figure 3:
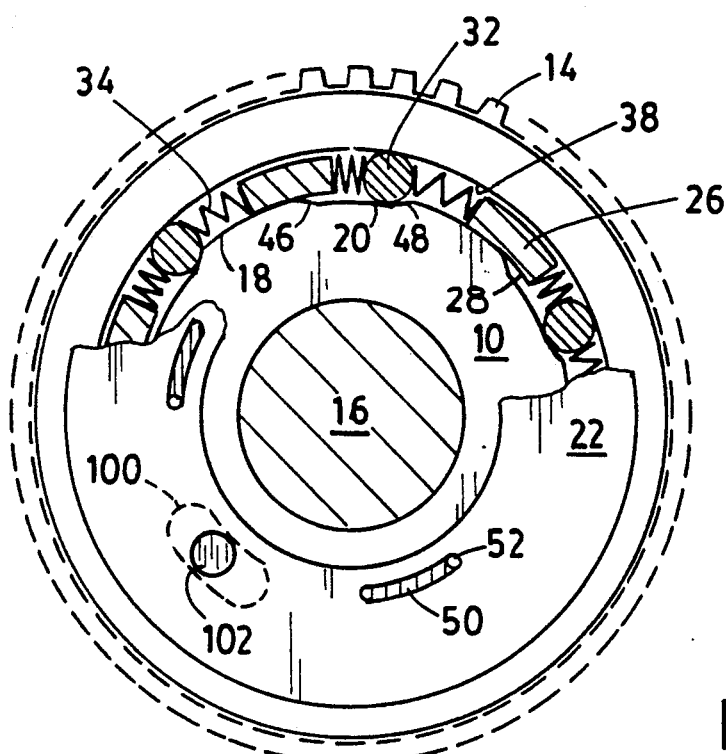
FIG. 3 is a view similar to FIG. 2, but showing the rollers in the other of their two limit positions.

Each of the annular plates 22 and 24 also has formed in its peripheral surface adjacent to bearing race 40 a plurality of radially projecting vanes 44 that are disposed in communication with a hydraulic delivery system for rotatively indexing the retainer 12 between two limit positions. The two limit positions are shown in FIGS. 2 and 3, respectively. Each end of the respective recesses 20 in the cam disk includes oppositely inclined ramp surfaces 46 and 48 where the recess merges with adjacent cam lobes 18. The ramp surfaces 46 and 48 are oriented with respect to bearing race 38 of the ring gear so that rollers 32 may be moved along either ramp surface into contact with the bearing race.

At the limit position shown in FIG. 2, bearing retainer 12 has been rotated counterclockwise with respect to cam disk 10 until one end of arcuate slots 50 formed through arcuate plates 22 and 24 contacts stop pins 52 that project from a radial surface of the cam disk. Compression springs 34 urge rollers 32 in the counterclockwise direction along ramp surfaces 46 into contact with bearing race 38 of the ring gear. Counterclockwise rotation of ring gear 14 with respect to cam disk 10 wedges the rollers 32 between ramp surfaces 46 and bearing race 38, thereby engaging the roller clutch for rotatively connecting the ring gear to shaft 16. However, clockwise relative rotation of the ring gear urges the rollers 26 against compression springs 34 in the clockwise direction along ramp surfaces 46 out of wedging contact with the bearing race, thereby disengaging the roller clutch for permitting the ring gear to freewheel about shaft 16.

At the other limit position shown in FIG. 3, roller retainer 12 has been indexed clockwise with respect to cam disk 10 until stop pins 52 of the cam disk contact the opposite ends of arcuate slots 50 of the arcuate plates. Compression springs 34 urge rollers 32 in the clockwise direction along ramp surfaces 48 into contact with bearing race 38 of the ring gear. Accordingly, the roller clutch is engaged by clockwise rotation of ring gear 14 with respect to cam disk 10 and is disengaged by counterclockwise relative rotation.

Figure 5:
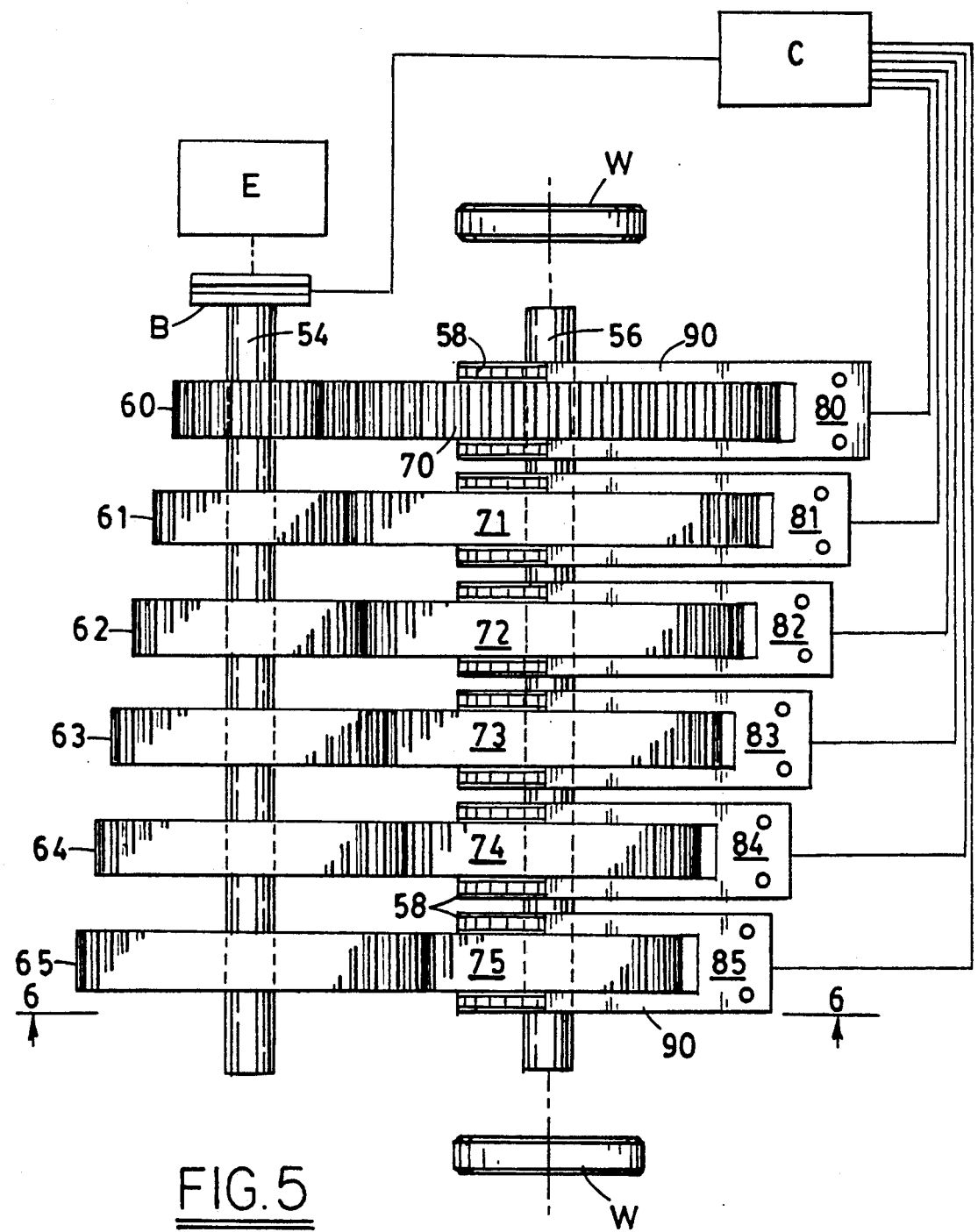
FIG. 5 is a plan view of a transmission made according to my invention showing intermeshing driver and driven gear clusters, and a series of hydraulic actuators for indexing roller clutches of the driven gear cluster.

In FIG. 5, a series of my roller clutches are assembled as part of a novel transmission. The transmission includes a driver shaft 54 that is operatively connected to a vehicle's engine E, and a driven shaft 56 that is operatively connected to the vehicle's wheels W. A series of driver gears 60 through 65 of progressively increasing pitch diameter are mounted for rotation with driver shaft 54. Driven shaft 56, together with a series of my roller clutches, rotatively supports a series of driven gears 70 through 75 of progressively decreasing pitch diameter. Each of the roller clutches is mounted within the transmission such that shaft 16 of the previously referenced illustrations corresponds to the driven shaft 56, and ring gear 14 corresponds to any one of the driven gears 70 through 75. Of the remaining portions of the previously illustrated roller clutch, only the vaned portions of annular plates 22 and 24 are visible in the view of FIG. 5 as referenced by numeral 58.

Driver shaft 54 and driven shaft 56 are mounted parallel to each other, and their respective driver and driven gears are equally spaced along their axes in mesh with each other. The progressively varying pitch diameters of the driver and driven gears define intermeshing gear pairs of varying gear ratio for transmitting power between the shafts. Although the term "gear ratio" usually refers to a ratio formed by dividing the pitch diameter of the larger member of a gear pair by the pitch diameter of the smaller member of the pair, the term "gear ratio" is used in the context of my transmission as a ratio formed by dividing the pitch diameter of the driven gear member of each pair by the pitch diameter of the driver gear member of the same pair to more consistently reference the uniform progression of gear ratios throughout my transmission. Accordingly, the so-called "low" to "high" gear range of my transmission may be understood to extend from gear pair 60, 70 to gear pair 65, 75; and throughout that range, the gear ratios of the succeeding gear pairs progressively decrease.

Each of the driven gears 70 through 75 is mounted adjacent to one of eight stationary hydraulically operated housings 80 through 85, respectively. Each of the housings 80 through 85 includes a pair of parallel arms 90 which partially envelop the respective vaned annular plates 58 of each roller clutch.

Figure 6:
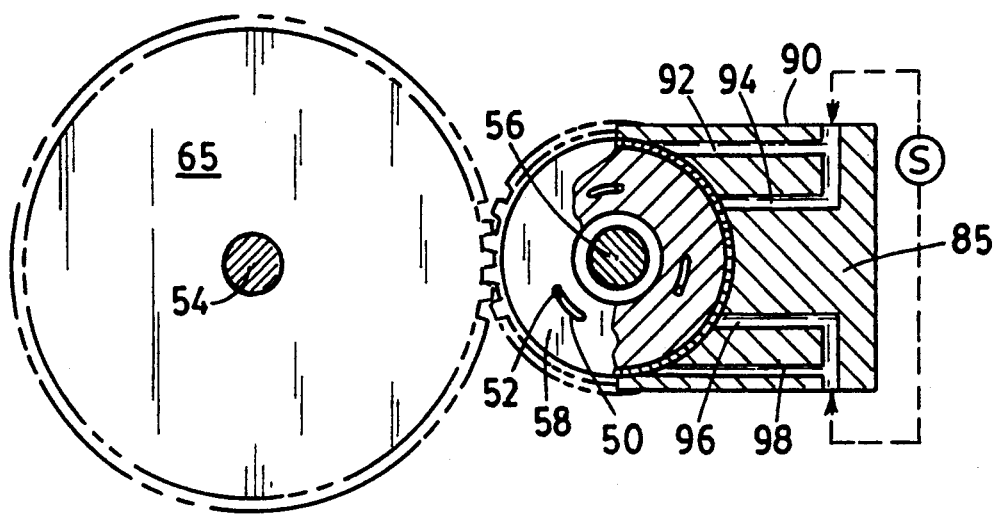
FIG. 6 is a fragmentary sectional view taken generally along line 6—6 in FIG. 5, illustrating one of the hydraulic actuators for indexing respective roller clutches of the driven gear cluster between the two limit positions.
Figure 4:
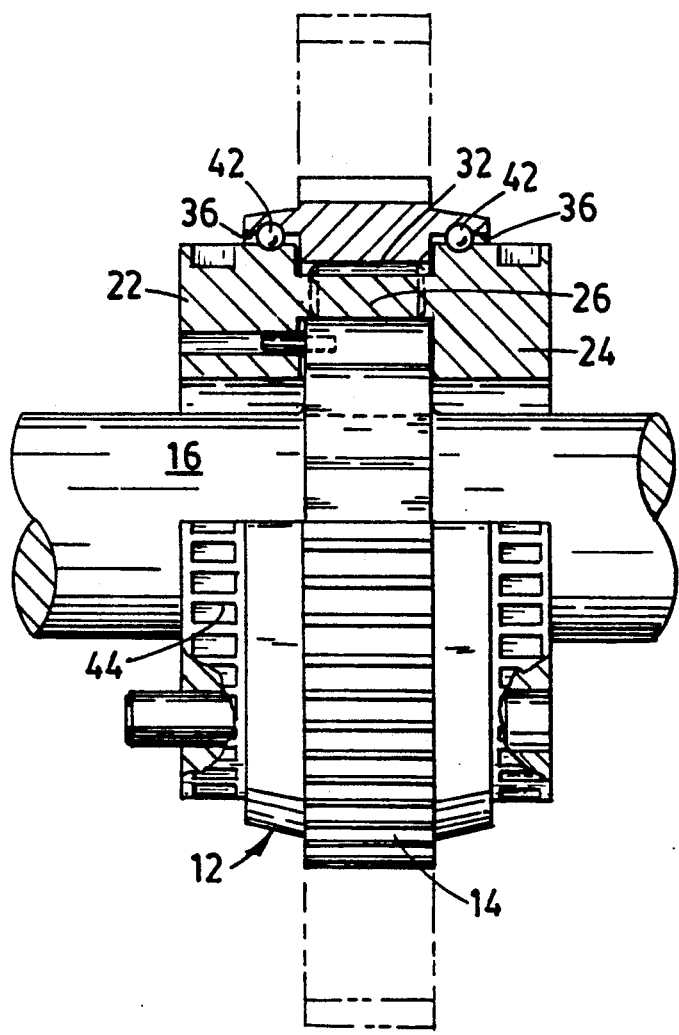
FIG. 4 is a side view of my roller clutch taken perpendicular to its axis of rotation, but with portions broken away and shown in section.

With reference to FIG. 6, an exemplary hydraulically operated housing 85 is depicted in a partially cutaway cross-sectional view through one of the vaned annular plates 58. Parallel arm 90 partially envelops opposite diametral sides of annular plate 58. A pair of upper fluid supply ducts 92 and 94 and a pair of lower fluid supply ducts 96 and 98 are formed in respective portions of each arm that envelop the opposite sides of the plates. Each pair of supply ducts can be separately connected to a supply "S" of fluid under pressure for discharging the fluid against the vanes formed on one or the other diametral sides of the annular plates.

For example, fluid discharged through the upper ducts 92 and 94 is directed tangentially against one diametrical side of annular plate 58, and urges the plate, together with the roller retainer of the associated roller clutch, to rotate counterclockwise with respect to the driven shaft 56. In contrast, fluid discharged from the lower ducts 96 and 98 rotates the plate 58 and associated roller retainer in the clockwise direction with respect to the driven shaft. However, the amount of clockwise and counterclockwise rotation is limited by the arcuate slots 50 and stop pins 52 as described above with respect to my exemplary roller clutch.

An onboard computer C is used to control the discharge of fluid by each of the stationary hydraulically operated housings 80 through 85. Well known criteria relating to rotational speed and torque being transmitted by the transmission may be processed by the computer C for determining an appropriate gear ratio for interconnecting the vehicle's engine E with its drive wheels W. Although it is a relatively simple matter to also program the computer to control the discharge of fluid from either pair of ducts of each hydraulically operated housing, my invention provides an improved way of indexing the series of two-way roller clutches for shifting my transmission between different gear ratios.

For example, assuming a clockwise rotation of driver shaft 54 under power from engine E, my transmission may be shifted into the so-called "neutral" position by indexing all of my roller clutches to the limit position shown in FIG. 3. The clockwise rotation of driver shaft 54 together with the series of driver gears 60 through 65 produces counterclockwise rotation of driven gears 70 through 75 with respect to driven shaft 56. All of the roller clutches interposed between the driven shaft and driven gears are disengaged by the relative counterclockwise rotation, thereby permitting all of the driven gears to freewheel about the driven shaft.

My transmission may be shifted into so-called "first" gear by discharging fluid from the upper ducts of housing 80, thereby indexing annular plates 58 counterclockwise to the limit position shown in FIG. 2. The counterclockwise rotation of driven gear 70 with respect to driven shaft 56 engages the associated roller clutch for transmitting power between driver shaft 54 and driven shaft 56 through gear pair 60, 70 having the highest gear ratio. The lower gear ratio pairs may be similarly engaged for shifting my transmission to "second" or "higher gear" by successively indexing the roller clutches of the lower gear ratios in the counterclockwise direction.

However, it is important to note that although two or more roller clutches may be indexed to the counterclockwise limit position, only the roller clutch associated with the lowest gear ratio pair remains engaged for delivering power. The lower gear ratio pairs have the effect of increasing the rotational speed of driven shaft 56 with respect to a given speed of driver shaft 54. Accordingly, the driven shaft is rotated by a lower gear ratio pair faster than the driven gears of the higher gear ratio pairs are rotated by their mating driver gears. The faster relative rotation of the driven shaft has the effect of relatively rotating the driven gears in the clockwise direction which disengages the roller clutches of the higher gear ratios. Thus, once the roller clutch of the next lowest gear ratio pair is indexed to the counterclockwise limit position shown in FIG. 2, the higher gear ratio pairs are automatically disengaged at the same limit position, leaving the next lowest gear ratio pair providing the sole operative connection between driver shaft 54 and driven shaft 56. All of the roller clutches must be successively indexed to the counterclockwise position of FIG. 2 to engage the lowest gear ratio pair 65, 75, and thereby shift my transmission into so-called "high gear".

Since my roller clutches are indexable between two limit positions at which my clutches are engageable, it is especially important to maintain all of the roller clutches associated with higher gear ratio pairs indexed to the same counterclockwise index position at which a lower gear ratio pair is engaged during the progression from low to high gear. However, if the roller clutch of any higher gear ratio pair were to be inadvertently indexed to the clockwise limit position shown in FIG. 3, the roller clutch of the higher gear ratio pair would be automatically engaged by the clockwise relative rotation of its associated driven gear. Accordingly, the driver and driven shafts of my transmission would then be inadvertently connected by more than one gear pair of different gear ratios, and a torque windup between the shafts would be created that could abruptly stop the transmission and possibly result in its total failure. The same event could also pose a significant safety hazard by locking up the drive wheels against further rotation and sending the vehicle into an unintentional skid.

Figure 7:
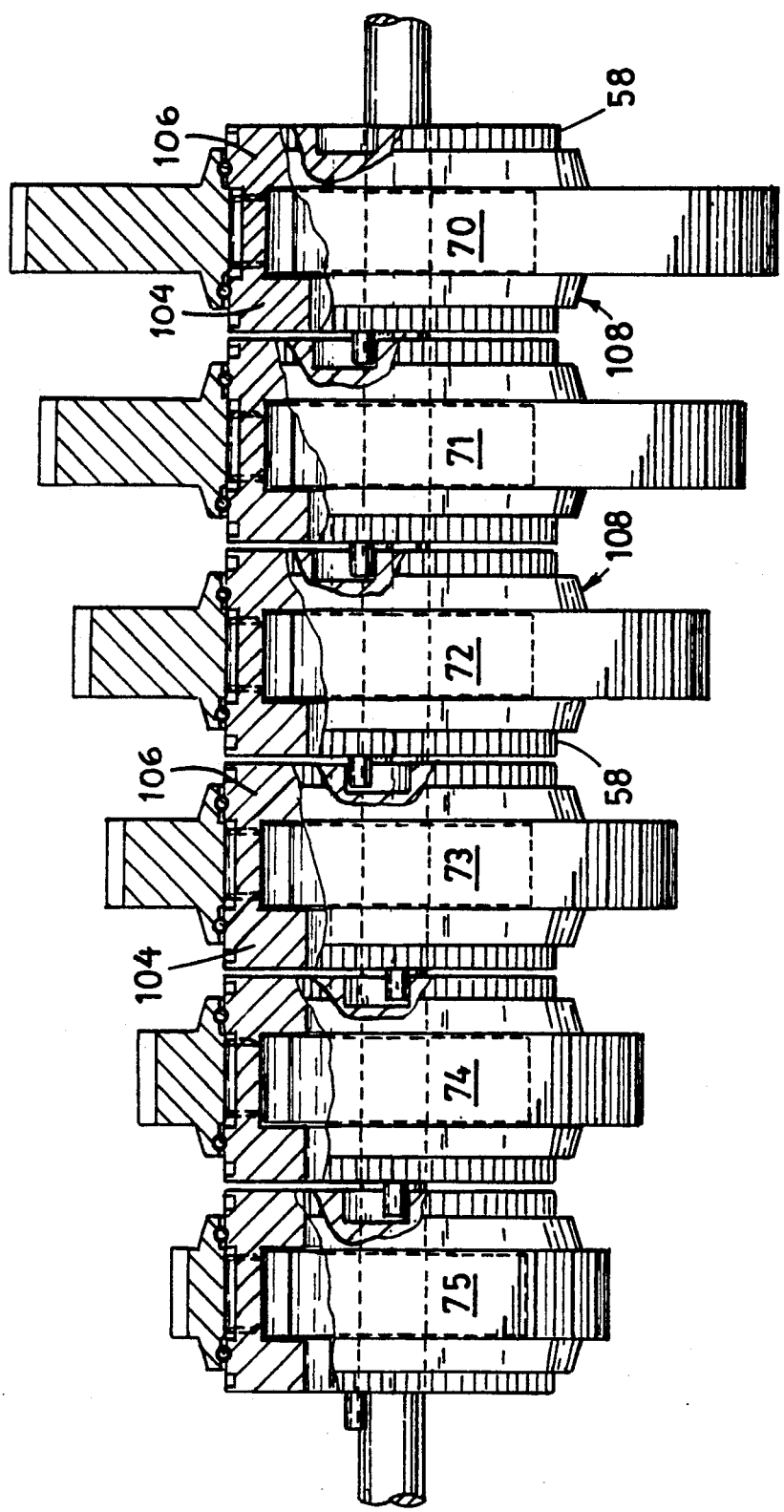
FIG. 7 is a fragmentary sectional view of the driven gear cluster of FIG. 5, illustrating means interlocking adjacent roller clutches for limiting relative rotation of the roller clutches with respect to each other.

Accordingly, my invention includes an important safety feature which is depicted schematically in FIG. 7. The annular plates 58 of adjacent roller clutches are interconnected by respective arcuate slots 100 and stop pins 102. One plate of each roller retainer is fitted with at least one stop pin 102 and the other plate of each roller retainer is formed with corresponding arcuate slots 100. The earlier mentioned arcuate slots 50 and stop pins 52 shown in FIGS. 2 and 3 limit relative rotation between respective roller retainers and cam disks for establishing the two limit positions of each roller clutch. In contrast, the present arcuate slots 100 and stop pins 102 limit relative rotation between roller retainers of adjacent roller clutches.

For example, the leftmost plates 104 of each roller retainer 108 shown in FIG. 7 are fitted with at least one stop pin 102. The confronting rightmost plates 106 of each roller retainer include at least one arcuate slot 100 which is dimensioned to receive the stop pins and to limit the amount of relative rotation between the confronting plates 104 and 106. The roller retainers 108 of driven gears 70 through 72 are shown indexed to their counterclockwise limit position. The counterclockwise index positions of the roller retainers associated with gears 71 and 72 position one end of their respective slots 100 against the respective pins 102 of driven gears 70 and 71. Accordingly, when the roller retainer of gear 72 is indexed counterclockwise as shown, the gears 70 and 71 are also locked in a counterclockwise index position. The remaining driven gear members 73 through 75 of the lower gear ratios may be indexed sequentially or as a group from one limit position to the other. However, hydraulic pressure is preferably used to maintain roller clutches of the remaining driven gear members indexed to their clockwise limit position until another gear shift is required.

Although only three of the driven gears 70 through 72 are shown indexed to the counterclockwise index position, it may be understood that once the roller retainer of the next lowest gear ratio (i.e., driven gear 73) is indexed to the counterclockwise limit position, the roller retainer of driven gear 72 is also locked to the same counterclockwise limit position. The same sequence may be followed until the roller retainer of driven gear 75 locks all of the roller retainers of the higher gear ratios in the counterclockwise limit position.

In addition to protecting my transmission against failure, the just above-described mechanical interlocking feature permits each roller clutch of the different gear ratio pairs to be indexed only once by the fluid pressure of the stationary hydraulic control housings during a sequence of gear shifts between low and high gear. In other words, the roller clutches of the higher gear ratios may be safely maintained in an appropriate limit position without requiring the use of hydraulic pressure.

However, once my transmission is shifted into high gear, it is not possible to disengage the lowest gear ratio pair 65, 75 by subsequently engaging any other gear pair. Nevertheless, my invention provides a computer-controlled disk brake B (see FIG. 5) that may be used to momentarily interrupt the transmission of torque to the driver shaft 54, and thereby enable the roller clutch of driven gear 75 to be indexed out of engagement. The clockwise indexing of the roller clutch of driven gear 75 enables driven gear 74 of the next highest gear ratio pair to be engaged for transmitting additional torque to the drive wheels. This feature permits my transmission to be shifted into a so-called "passing gear".

In particular, once the lowest gear ratio pair has been disengaged, the engine E momentarily accelerates the driver shaft 54, having the effect of reversing the direction of relative rotation between driven gear 74 and driven shaft 56. Since the roller retainer of driven gear 74 is already indexed to the counterclockwise position, the roller clutch of driven gear 76 is automatically engaged for delivering additional torque to the wheels W.

My transmission also provides for transmitting power from driven shaft 56 to driver shaft 54, thereby enabling the vehicle's engine E to be used for helping to slow the vehicle's wheels W. Ordinarily, it is expected that only high gear, represented by the lowest gear ratio pair 65, 75, will be used for purposes of breaking the vehicle, but it would also be possible in accordance with the present invention to successively engage each of the higher gear ratio pairs for this purpose as well. The lowest gear ratio pair 65, 75 may be engaged for braking the vehicle by indexing its associated roller retainer to the clockwise position shown in FIG. 3. Although this is the same index position which disengages driven gear 75 during the transmission of power to the wheels, relative rotation between driven gear 75 and driven shaft 56 is reversed by the effects of engine braking. Accordingly, the roller clutch of driven gear 75 is engaged at the clockwise limit position for transmitting power from driven shaft 56 to driver shaft 54.

The next highest gear ratio pair 64, 74 can be engaged for further slowing the vehicle by indexing its associated roller retainer to the same clockwise limit position. As a result, the lowest gear ratio pair 65, 75 is automatically disengaged by the increased rotational rate of driven gear 75 with respect to driven shaft 56. Each of the higher gear ratio pairs may be successively engaged in a similar manner by indexing their associated roller retainers to the clockwise limit position.

In further reference to FIG. 7, the slots 100 in the annular plates 106 of the roller retainers 108 may also be dimensioned with respect to stop pins 102 of annular plates 58 for maintaining adjacent roller retainers of the lower gear ratio pairs in the clockwise index position. This feature protects against the potentially disastrous effects of interconnecting the driver and driven shafts at two different gear ratios during engine braking.

Although my transmission has been described in connection with only the forward movement of a vehicle, it would also be possible to interpose a reverse drive jack shaft of conventional design between the driver and driven shafts to propel the vehicle in reverse. The conventional jack shaft forms no part of the present invention, but it is important in connection with the reverse drive to index the roller clutches to positions that do not interfere with the transmission of torque through the jack shaft. In addition, although my transmission has been illustrated with only six different gear pairs of different ratios, eight or more different gear ratios may be preferable in many applications of my transmission.

From the foregoing, it will be apparent that my invention provides a much improved means of shifting between different gear ratios by positively indexing roller clutches between limit positions at which they are automatically engaged by respective directions of relative rotation between a ring gear and shaft. No time is lost waiting for indirect means to index the roller clutches. Also, my transmission provides for shifting between different gear ratios that would otherwise not be possible by the known indirect means of engaging roller clutches (i.e., "down shifted" as well as "up shifted"). My transmission may be made of relatively simple and uniform construction by using substantially the same roller clutches and indexing mechanisms for all of the driven gears. On four wheel drive vehicles, my transmission may be used in place of a conventional transfer case by connecting opposite ends of driven shaft 56 to the front and rear drive shafts.

Although I have described in detail the preferred embodiment of my transmission, many other variations are possible within the scope of my teaching. For example, I prefer to use my roller clutches to connect the driven gears to the driven shaft, but it would also be possible to use my roller clutches to connect the driver gears and driver shaft. Although I believe it best to use a hydraulic indexing mechanism, other indexing mechanisms of a mechanical or electrical type could also be used to index my rollers between their two limit positions. Of course, my roller clutches could also be modified in ways which preserve their essential functions. Instead of forming a camming member as part of a shaft as preferred, the camming member could also be formed as part of the inner gear hub, and the roller bearing race could be formed as part of the shaft. The number of gear ratios is selected to provide for a continuous transmission of torque with no loss of rotation between driver and driven shafts and to optimize use of the vehicle's engine to deliver torque throughout a limited range of speeds.

I claim:

1. A variable speed transmission comprising:
a first shaft having a first series of coaxially spaced gears mounted for rotation therewith;
a second shaft having a second series of coaxially spaced gears mounted in mesh with said first series of gears;
said first and second series of gears defining respective gear pairs of progressively increasing gear ratio for selectively transmitting power from one of said shafts to the other;
a series of two-way roller clutches interposed between respective gear members of said second series of gears and said second shaft, said roller clutches being engageable for rotatively coupling said respective gear members to said second shaft and being disengageable for permitting relative rotation between said respective gear members and said second shaft;
each of said roller clutches including a camming member having a plurality of recesses formed in its surface and a roller retainer circumferentially supporting a plurality of rollers within respective recesses in said camming member;
an externally controlled actuator operatively connected to each of said retainers for indexing said roller retainers together with said plurality of rollers between respective limit positions within said recesses, one of said limit positions enabling engagement of said roller clutches in response to one direction of relative rotation between said respective gear members and said second shaft and the other of said limit positions enabling engagement of said roller clutches in response to an opposite direction of relative rotation between said respective gear members and said second shaft; and
a disk brake for momentarily interrupting transmission of engine torque to one of said shafts, thereby enabling one of said roller clutches engaged at one of said limit positions to be indexed to the other of said limit positions.

2. The variable speed transmission of claim 1 further comprising means for limiting relative rotation between said roller retainers and said camming members of each of said roller clutches; said relative rotation being limited between said two limit positions.

3. A variable speed transmission comprising:
a first shaft having a first series of coaxially spaced gears mounted for rotation therewith;
a second shaft having a second series of coaxially spaced gears mounted in mesh with said first series of gears;
said first and second series of gears defining respective gear pairs of progressively increasing gear ratio for selectively transmitting power from one of said shafts to the other;
a series of two-way roller clutches interposed between respective gear members of said second series of gears and said second shaft, said roller clutches being engageable for rotatively coupling said respective gear members to said second shaft and being disengageable for permitting relative rotation between said respective gear members and said second shaft;
each of said roller clutches including a camming member having a plurality of recesses formed in its surface and a roller retainer circumferentially supporting a plurality of rollers within respective recesses in said camming member;
an externally controlled actuator operatively connected to each of said retainers for indexing said roller retainers together with said plurality of rollers between respective limit positions within said recesses, a first of said limit positions enabling engagement of said roller clutches in response to one direction of relative rotation between said respective gear members and said second shaft and a second of said limit positions enabling engagement of said roller clutches in response to an opposite direction of relative rotation between said respective gear members and said second shaft; and
means for limiting relative rotation between said roller retainers of adjacent ones of said roller clutches; said roller retainer of a first of said adjacent roller clutches being indexable between said first and second limit positions at said first limit position of said roller retainer of a second of said adjacent roller clutches, and not being indexable between said first and second limit positions at said second limit position of said roller retainer of the second of said adjacent roller clutches.

4. The variable speed transmission of claim 3 wherein said means for limiting relative rotation between roller retainers enables said roller retainer of one of said roller clutches associated with a lowest gear ratio pair of said progressively varying gear ratio pairs to maintain said roller retainers of all higher gear ratio pairs indexed to the same limit position at which said roller retainer of the lowest gear ratio pair is engaged.

5. A variable speed transmission of the type which includes two parallel driver and driven shafts, said driver shaft being operatively connected with a vehicle's engine for rotation therewith and said driven shaft being operatively connected to the vehicle's wheels for rotation therewith; a series of driver gears mounted for rotation with said driver shaft and a series of driven gears mounted on said driven shaft in mesh with said series of driver gears, said driver and driven gears defining a series of gear pairs of varying gear ratio for interconnecting said driver and driver shafts; a series of two-way roller clutches interposed between said driven gears and said driven shaft; said two-way roller clutches being engageable for rotatively coupling said driven gears to said driven shaft and being disengageable for permitting relative rotation between said driven gears and said driven shaft; each of said two-way roller clutches including a cam disk mounted for rotation with said driven shaft and having a plurality of recesses formed in its peripheral surface, a roller retainer circumferentially supporting a plurality of rollers between respective recesses in said cam disk, and a bearing race for said rollers formed in respective gear hubs of said driven gears; and an externally controlled actuator for selectively limiting engagement of said roller clutches, characterized by:

a hydraulically operated actuator connected to each of said retainers for indexing said roller retainers together with said plurality of rollers between respective limit positions within said recesses, said actuator including an annular plate rotatively coupled to said roller retainer having angularly spaced vanes in communication with a pair of fluid supply ducts of a stationary housing for communicating a supply of pressurized fluid against said angularly spaced vanes, one of said supply ducts providing for indexing said roller retainer to one of said limit positions and the other of said supply ducts providing for indexing said roller retainer to the other of said limit positions;

said one limit position enabling engagement of said roller clutches in response to one direction of relative rotation between said driven gears and said driven shaft and said other limit position enabling engagement of said roller clutches in response to an opposite direction of relative rotation between said driven gears and said driven shaft; and respective stop pins and arcuate slots formed in said annular plates and said roller retainers of each of said roller clutches for limiting relative rotation between said annular plates and said roller retainers between said two limit positions.

6. The transmission of claim 5 wherein said stop pins of said plates located at one end of said roller retainers are received in said arcuate slots of said plates located at the other end of adjacent roller retainers; and said arcuate slots are dimensioned so that each of said roller retainers is indexable between said two limit positions at one limit position of said adjacent roller retainers, and is not indexable between said two limit positions at the other limit position of said adjacent roller retainers.

7. The transmission of claim 6 further comprising a disk brake for momentarily interrupting transmission of engine torque to said driver shaft, thereby enabling one of said roller clutches engaged at one of said limit positions to be indexed to the other of said limit positions.

* * * * *